United States Patent [19]
Nakamoto

[11] Patent Number: 6,127,682
[45] Date of Patent: *Oct. 3, 2000

[54] SCANNING PROBE MICROSCOPE AND METHOD OF ANALYZING SAMPLE USING SAME

[75] Inventor: Keiichi Nakamoto, Tokyo, Japan

[73] Assignee: Jeol Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/936,753

[22] Filed: Sep. 25, 1997

[51] Int. Cl.$^7$ ...................................................... H01J 37/20
[52] U.S. Cl. ........................................... 250/306; 250/307
[58] Field of Search ................................... 250/306, 307, 250/423 F

[56] References Cited

U.S. PATENT DOCUMENTS

| | | | |
|---|---|---|---|
| 5,253,516 | 10/1993 | Elings et. al. ............................ | 250/306 |
| 5,360,977 | 11/1994 | Onuki et. al. ............................ | 250/306 |
| 5,468,959 | 11/1995 | Tohda et. al. ............................ | 250/307 |
| 5,621,210 | 4/1997 | Lindsay ................................... | 250/306 |
| 5,750,989 | 5/1998 | Lindsay et. al. ................... | 250/442.11 |
| 5,861,624 | 1/1999 | Alexander et. al. ..................... | 250/306 |

OTHER PUBLICATIONS

"Scanning Tunneling Microscopy and Atomic Force Microscopy: Application to Biology and Technology", P. K. Hansma, V.B. Elings, O. Marti, C.E. Bracker, *Science*, vol. 242, pp. 209–216 Oct. 14, 1988.

*Primary Examiner*—Bruce C. Anderson
*Attorney, Agent, or Firm*—Webb Ziesenheim Logsdon Orkin & Hanson, P.C.

[57] ABSTRACT

There is disclosed a scanning probe microscope capable of operating either as a scanning tunneling microscope (STM) or as an atomic force microscope (AFM). The probe microscope uses only one scanner in both modes of operation. When the instrument is operated in the AFM mode, the scanner is mounted to a base stage. The distance between a sample and an AFM tip is controlled. The sample is held to the front end of the scanner. An atomic force exerted between the tip and the sample is measured. When the instrument is operated in the STM mode, a sample stage is mounted to the base stage. The scanner is held opposite to the sample stage. A voltage is applied between the sample held to the sample stage and an STM tip attached to the front end of the scanner. The induced tunneling current between the STM tip and the sample is measured.

5 Claims, 4 Drawing Sheets

SCANNING PROBE MICROSCOPE AND METHOD OF ANALYZING SAMPLE USING SAME

FIELD OF THE INVENTION

The present invention relates to a scanning probe microscope (SPM) such as a scanning tunneling microscope (STM) for observing a sample utilizing the principle of the tunneling effect and an atomic force microscope (AFM) for measuring a physical force produced between a probe tip and a sample and investigating the topography of the surface. Especially, the invention relates to a scanning probe microscope having one scanner performing the functions of both STM and AFM.

BACKGROUND OF THE INVENTION

A scanning tunneling microscope (STM) utilizing the principle of a so-called tunneling effect has been developed. That is, a metal probe having a sharpened tip is brought close to a sample. When a weak bias voltage is applied between them, electrons migrate through the gap between the probe and the sample. Either the probe or the sample is scanned in two dimensions, using piezoelectric devices, while maintaining constant the distance between the probe and the sample. In this way, the topography of the sample surface can be imaged at an atomic-scale resolution.

FIG. 3 schematically shows such a conventional scanning tunneling microscope. The body of this microscope is generally indicated by numeral 1, and comprises a probe 3, a scanner 4, an x piezoelectric device-driving circuit 5, a y piezoelectric device-driving circuit 6, a z piezoelectric device-driving circuit 7, a scan generator 8, a display unit 9, a bias circuit 10, a current-to-voltage converter amplifier 11, a logarithmic converter circuit 12, a comparator circuit 13, and an integrator circuit 14. Indicated by 2 is a sample. The scanner 4 comprises an x piezoelectric device 4X, a y piezoelectric device 4Y, and a z piezoelectric device 4Z.

In this scanning tunneling microscope 1, the z piezoelectric device 4Z is driven according to a height (i.e., a dimension taken along the z-axis) adjusting signal from the integrator circuit 14. The probe 3 is brought close to the sample 2 until the probe 3 is spaced an initial set distance d (nm) from the sample 2. Under this condition, the scan generator 8 produces x and y scanning signals to the x piezoelectric device 4X and the y piezoelectric device 4Y, respectively, to drive them. As a result, the probe 3 scans the surface of the sample 2 along the x- and y-axes.

At the same time, the bias circuit 10 applies a bias voltage between the sample 2 and the probe 3, thus inducing a tunneling current from the probe 3 to the sample 2. When the probe 3 scans the surface of the sample 2 along the x- and y-axes, the distance between the sample 2 and the probe 3 is varied due to topography of the surface of the sample 2. Accordingly, the distance between the sample 2 and the probe 3 is controlled so that the tunneling current is kept constant if the probe 3 scans along the x- and y-axes.

This control is described in further detail. The tunneling current from the probe 3 is converted into a voltage and amplified by the current-to-voltage converter amplifier 11 and sent to the logarithmic converter circuit 12. This logarithmic converter circuit 12 linearizes its input signal so that the output signal from the current-to-voltage converter amplifier 11 has a linear relation to the distance between the sample 2 and the probe 3. Then, the output signal from the logarithmic converter circuit 12 is fed to the comparator circuit 13, which in turn compares the output value from the logarithmic converter circuit 12 with a reference value corresponding to a preset value of the tunneling current. The comparator circuit 13 produces the difference between the output value from the logarithmic converter circuit 12 and the reference value to the integrator circuit 14, which integrates the output value from the comparator circuit 13. The z piezoelectric device 4Z is driven according to the output from the integrator circuit 14. Thus, the distance between the sample 2 and the probe 3 is controlled in such a way that the tunneling current is maintained constant.

The output from the integrator circuit 14 is also sent to the display unit 9, which also receives the output signal from the scan generator 8. In consequence, a topographic image of the sample 2 is displayed on the viewing screen of the display unit 9.

In the conventional scanning tunneling microscope 1, the sample can be scanned at a higher rate than the probe 2 that is lighter in weight. Therefore, it is common practice to adopt the probe scanning method, i.e., the probe 2 is attached to the front end of the scanner 4 and the surface of the sample 2 is scanned.

Atomic force microscopes (AFMs) for investigating a sample surface by measuring the physical force between the probe and the sample have also been developed. FIG. 4 schematically shows such a conventional atomic force microscope, which is generally indicated by numeral 15 and comprises a resilient cantilever 16, a probe 17 attached to the front end of the cantilever 16, a laser 18, a photodetector 19, a piezoelectric device-driving power supply 20, a scan generator 21, a central processing unit (CPU) 22, a display unit 23, a preamplifier 24, an error amplifier 25, and a mirror 26.

In this atomic force microscope 15, the laser 18 directs laser light at the top surface of the cantilever 16. The reflected light is guided to the photodetector 19 via the mirror 26. Under this condition, the probe 17 and the sample 2 are brought closer to each other until the distance between them becomes less than 1 nm. An atomic force that is either a repulsive or attractive force is exerted between an atom at the front end of the probe 17 and the surface atom layer of the sample 2. The probe 2 undergoes this force, deflecting the cantilever 16 upward or downward. This in turn changes the position on the photodetector 19 on which the laser light is incident. A signal representing the resulting change is produced from the photodetector 19 and sent to the piezoelectric device-driving power supply 20 via the preamplifier 24 and via the error amplifier 25. This power supply 20 provides a feedback control over the z (i.e., along the height) piezoelectric device 4Z so that the distance between the probe 17 and the sample 2 is kept constant (i.e., the atomic force is kept constant).

The output from the error amplifier 25 is associated with the output from the photodetector 19 and sent to the CPU 22. The output is displayed on the display unit 23. The probe 17 or the sample 2 is scanned in two dimensions while controlling the distance between the probe 17 and the sample 2. As a result, a topographic image of the surface of the sample 2, or a constant force image, is presented on the display unit 23. In this way, in the conventional atomic force microscope 15, the cantilever 16 held on its one side is used. Therefore, the sample 2 is generally attached to the front end of the scanner 4 and scanned.

If one tries to incorporate the functions of both scanning electron microscope 1 and atomic force microscope 15 into one scanning probe microscope, it follows that the probe scanning method and the sample scanning method are both used. This necessitates two scanners even if only the same scan is made.

The preparation of the two scanners doubles the cost. Furthermore, the two scanners must be adjusted separately. In this way, longer time and much labor are necessary to make adjustments.

SUMMARY OF THE INVENTION

In view of the foregoing, the present invention has been made.

It is an object of the present invention to provide an inexpensive scanning probe microscope which has one scanner performing the functions of both a scanning tunneling microscope and anatomic force microscope and which needs less labor to adjust.

It is another method of the invention to provide a method of analyzing a sample by the use of the scanning probe microscope described above.

A method of analyzing a sample by the use of a scanning probe microscope in accordance with the present invention can perform either atomic force microscopy (AFM) or scanning tunneling microscopy (STM). The microscope has a scanner and a base stage used in both modes of operation. In the AFM mode, the scanner is mounted to the base stage. The sample is held to the front end of the scanner. An AFM tip is held independent of the scanner. The distance between the AFM tip and the sample is adjusted. An atomic force exerted between them is measured. The sample is analyzed according to the measured atomic force. In the STM mode, a sample stage is mounted to the base stage. The scanner is held opposite to the sample stage. A voltage is applied between the sample held to the sample stage and an STM tip mounted to the front end of the scanner. A tunneling current flowing between this STM tip and the sample is measured. In this way, the sample is analyzed through the use of the scanning probe microscope in accordance with the invention.

A scanning probe microscope in accordance with the present invention can be operated in an atomic force microscopy (AFM) mode or a scanning tunneling microscopy (STM) mode. The microscope has a scanner and a base stage used in both modes of operation. In the AFM mode, the scanner is attached to the base stage. A sample holder is mounted to the scanner. An AFM tip is positioned close to the sample holder mounted to the sample holder. Means are provided to measure the atomic force exerted between the sample and the AFM tip. In the STM mode, a sample stage is mounted to the base stage. An STM tip is mounted to the scanner. The scanner is held opposite to the sample stage so that the STM tip and the sample attached to the sample stage are close to each other. Means are provided to measure the tunneling current induced between the sample and the STM tip.

Other objects and features of the invention will appear in the course of the description thereof, which follows.

DESCRIPTION OF THE PREFERRED EMBODIMENTS

Figure 1:
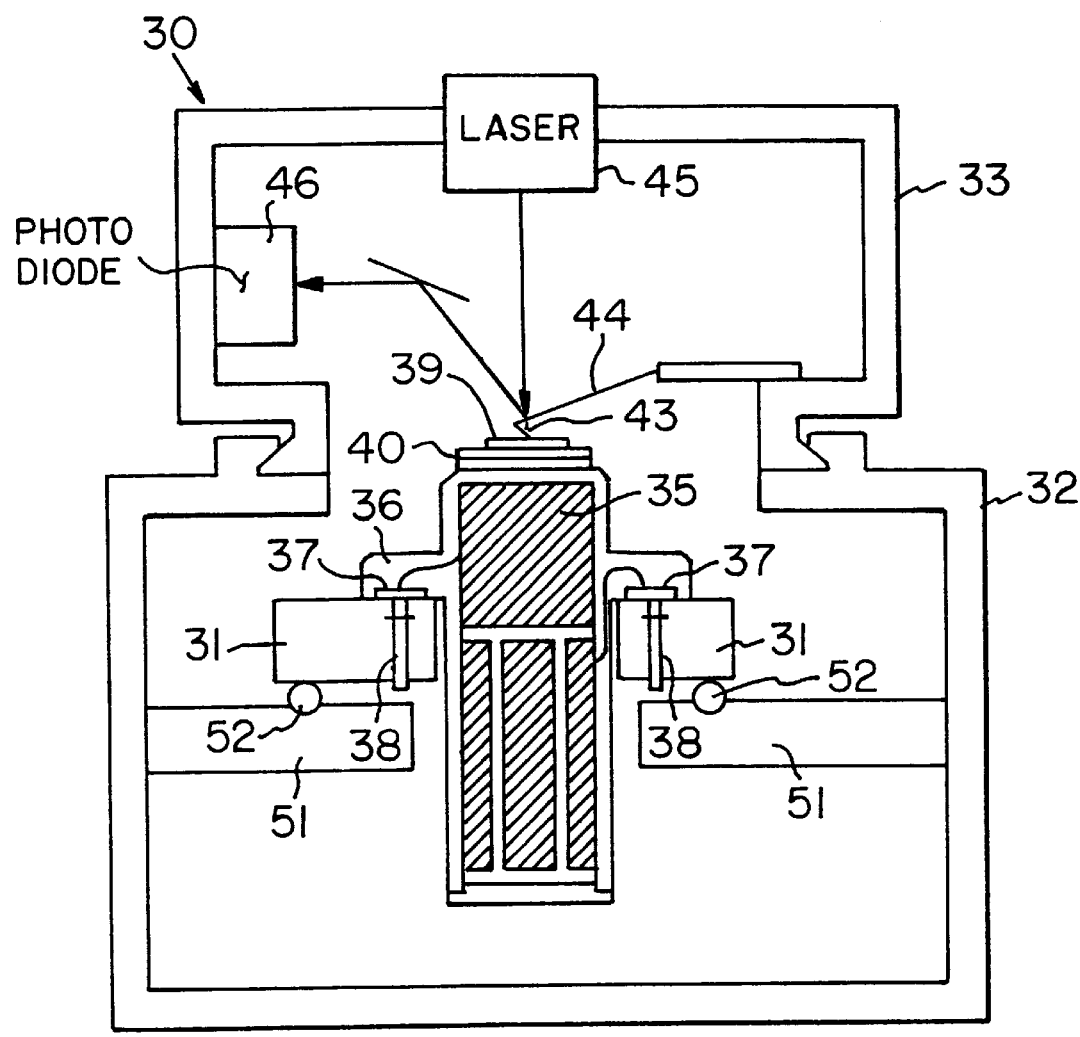
FIG. 1 is a schematic view of a scanning probe microscope in accordance with the present invention, and in which the microscope operates as an atomic force microscope.
Figure 2:
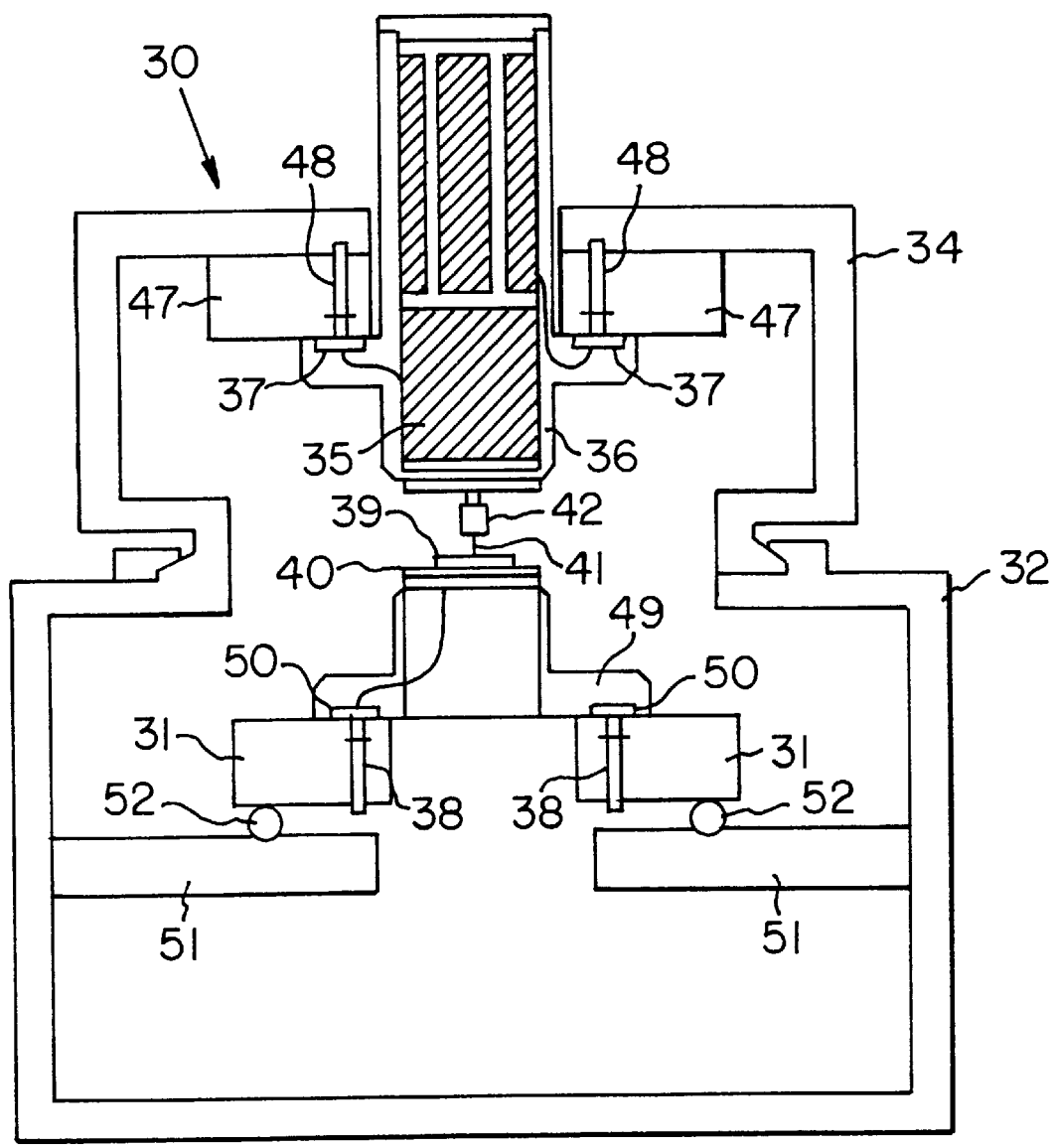
FIG. 2 is a view similar to FIG. 1, but in which the microscope operates as a scanning tunneling microscope.

Referring to FIGS. 1 and 2, there is shown a scanning probe microscope in accordance with the present invention. In the condition of FIG. 1, the instrument operates as an atomic force microscope (AFM). In the condition of FIG. 2, the instrument operates as a scanning tunneling microscope (STM).

In FIGS. 1 and 2, this scanning probe microscope, generally indicated by reference numeral 30, has a base unit 32 equipped with a base stage 31 capable of moving in the x-, y-, and z-directions. An AFM (atomic force microscope) head 33 and an STM (scanning tunneling microscope) head 34 are detachably mounted on the base unit 32. The base stage 31 is placed on spheres or balls 52 fixedly mounted on a pedestal 51. The scanning probe microscope 30 is further equipped with a scanner holder 36 incorporating a tubular scanner 35. This holder 36 has contact electrodes 37 electrically connected with electrodes, respectively, of the tubular scanner 35. Contact pins 38 are mounted on the base stage 31. A sample holder 40 for holding a sample 39 as shown in FIG. 1 is detachably mounted on the top end of the scanner 35. Also, a probe holder 42 for holding a metallic probe 41 as shown in FIG. 2 is detachably mounted on the top end of the scanner 35.

As shown in FIG. 1, the AFM head 33 has a cantilever 44, a laser 45 for directing laser light at the rear surface of the cantilever 44, and a photodiode 46 for receiving light reflected from the cantilever 44. This photodiode 46 is divided into two or four parts. A probe 43 is attached to the front end of the cantilever 44.

As shown in FIG. 2, a scanner stage 47 is mounted to the STM head 34. The scanner holder 36 holding the tubular scanner 35 is mounted to the scanner stage 47. Contact pins 48 are mounted on this scanner stage 47.

The scanning probe microscope 30 is further equipped with a sample stage 49 for performing scanning tunneling microscopy. Contact electrodes 50 electrically connected with the sample holder 40 are mounted on the sample stage 49.

When the scanning probe microscope 30 constructed in this way is operated as an atomic force microscope, the scanner holder 36 holding the tubular scanner 35 is mounted to the base stage 31 of the base unit 32, as shown in FIG. 1. The contact electrodes 37 make contact with the contact pins 38, electrically energizing the tubular scanner 35. Then, the sample holder 40 is mounted on the tubular scanner 35, and the sample 39 is placed on this sample holder 40. The AFM head 33 having the cantilever 44, the laser 45, and the photodiode 46 is mounted on the base unit 32.

Figure 4:
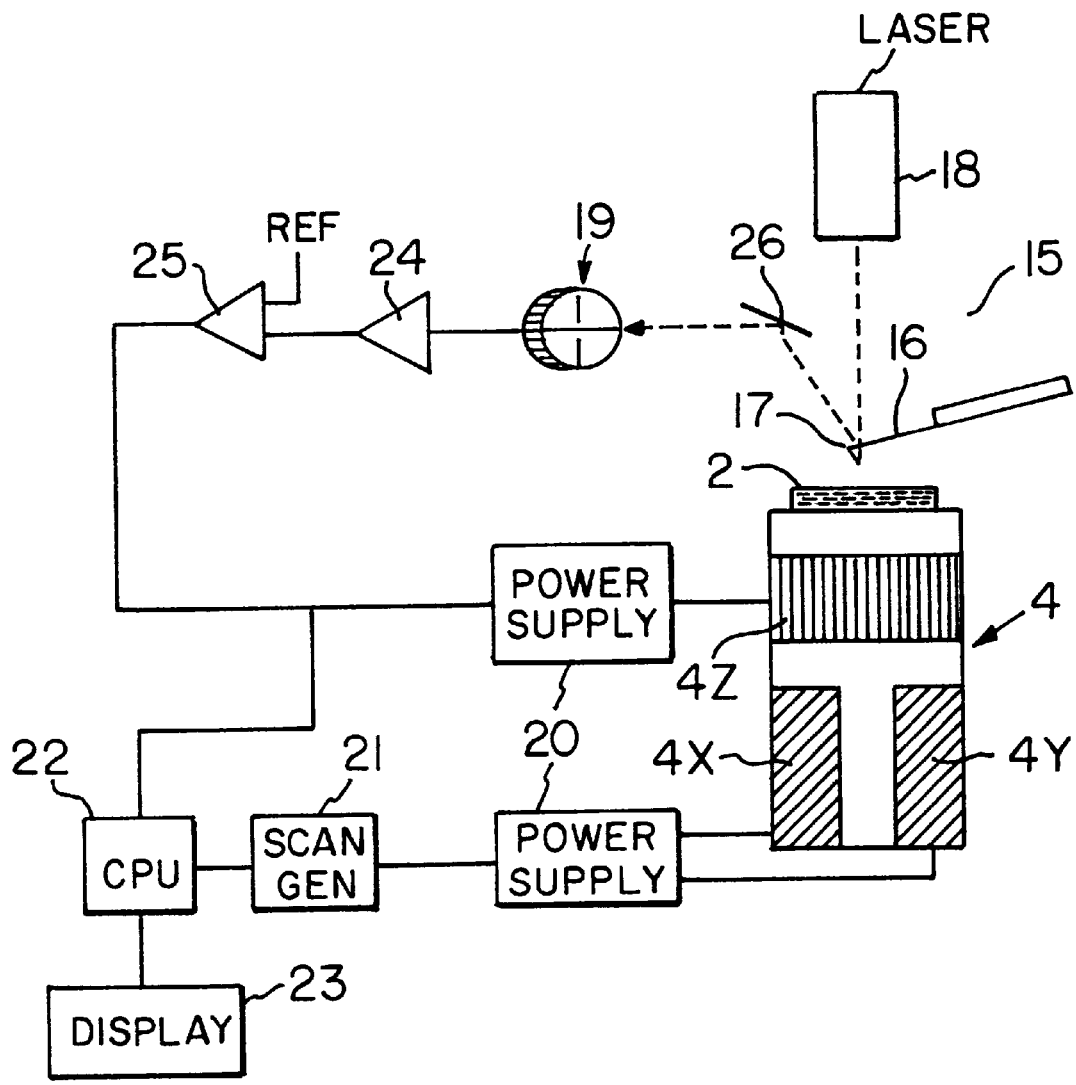
FIG. 4 is a schematic block diagram of a conventional atomic force microscope.

A control circuit (not shown) similar to the control circuit mounted between the photodiode 19 and the scanner 4 as shown in FIG. 4 is mounted between the photodiode 46 and the tubular scanner 35 in the same arrangement as in FIG. 4. The latter control circuit is composed of the piezoelectric device-driving power supply 20, the scan generator 21, the CPU 22, the display unit 23, the preamplifier 24, and the error amplifier 25.

When the sample 39 should be observed, the laser 45 directs laser light at the top surface of the cantilever 44, and the reflected light is received by the photodiode 46, in the same way as the conventional atomic force microscope 15 shown in FIG. 4. An atomic force that is either repulsive or attractive is exerted between an atom at the front end of the probe 43 and the atomic layer on the surface of the sample 39. This atomic force deflects the cantilever 44 upward or downward, changing the position of the photodiode 46 on which the reflected laser light impinges. The resulting change is represented by the output from the photodiode 46. The z piezoelectric device of the tubular scanner 35 undergoes a feedback control according to the output from the photodiode 46 via the aforementioned control circuit. Thus, the distance between the probe 43 and the sample 39 is maintained constant, i.e., the atomic force is kept constant.

The sample 39 is scanned in two dimensions while controlling the distance between the probe 43 and the sample 39 as described above. The output signal from the photodiode 46 is displayed on a display unit (not shown). In this way, a topographic image of the surface of the sample 39, or a constant force image, is presented on the display unit.

Where the scanning probe microscope 30 should be used as a scanning tunneling microscope, the sample stage 49 is first mounted to the base stage 31 of the base unit 32 as shown in FIG. 2. The sample holder 40 is mounted on the sample stage 49. The sample 39 is placed on the sample holder 40. As a result, the contact pins 38 make contact with the contact electrodes 50. A tunneling current flowing from the sample 39 through the sample holder 40 passes to the contact pins 38.

The scanner holder 36 holding the tubular scanner 35 is inverted compared with the case of the AFM (atomic force microscopy) mode and mounted to the scanner stage 47 of the STM head 34. The contact electrodes 37 make contact with the contact pins 48, thus electrically energizing the tubular scanner 35. Also, the probe holder 42 holding the probe 41 is mounted under the tubular scanner 35. Then, the STM head 34 to which the scanner holder 36 will be mounted is mounted on the base unit 32. The STM head 34 to which the scanner holder 36 has been mounted is mounted on the base unit 32.

Figure 3:
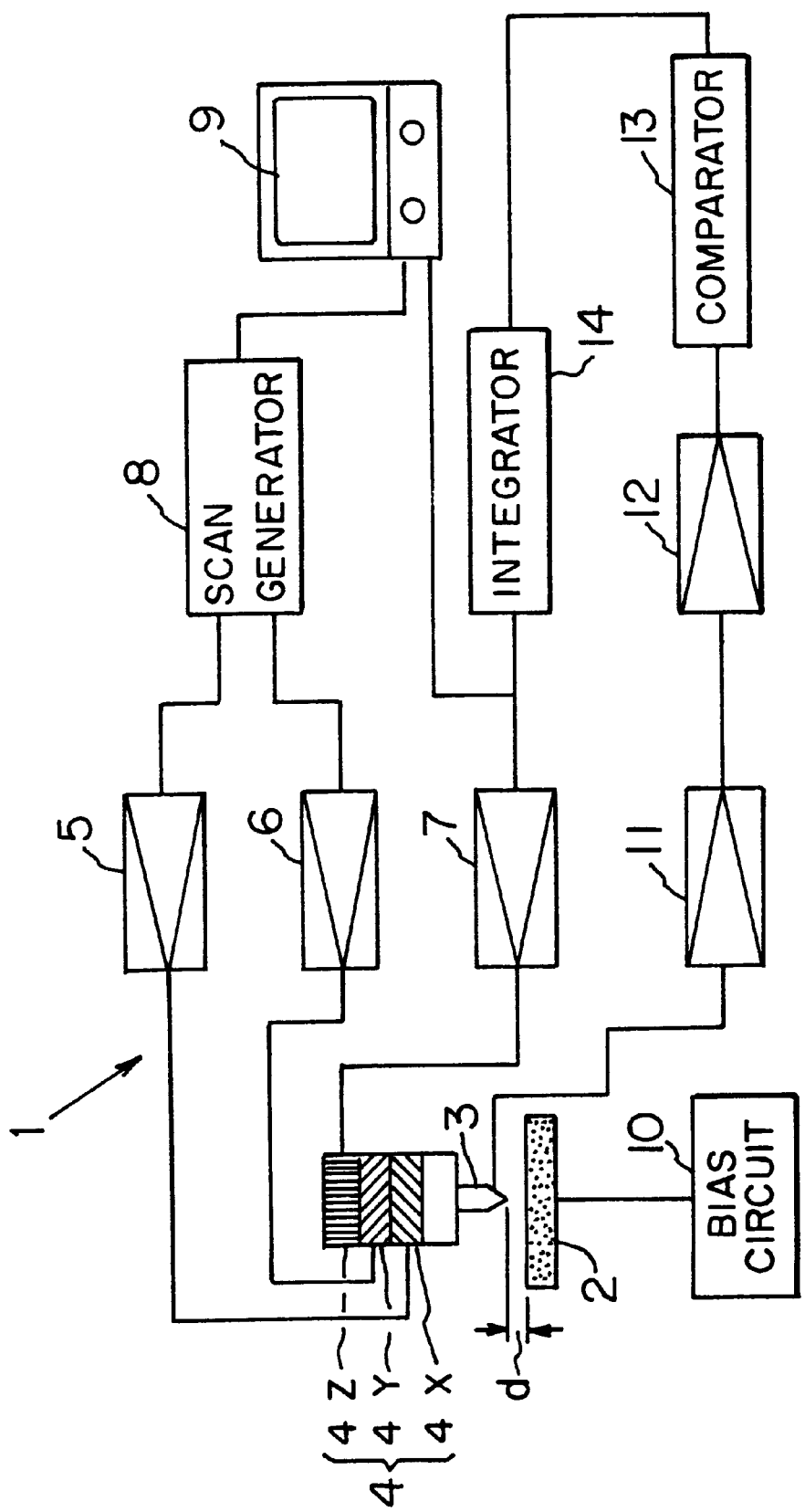
FIG. 3 is a schematic block diagram of a conventional scanning tunneling microscope.

A control circuit (not shown) similar to the control circuit mounted between the sample 2 and the scanner 4 as shown in FIG. 3 is mounted between each contact pin 38 and each contact pin 48 in the same arrangement as in FIG. 3. The latter control circuit is composed of the x piezoelectric device-driving circuit 5, the y piezoelectric device-driving circuit 6, the z piezoelectric device-driving circuit 7, the scan generator 8, the CPU monitor 9, the bias circuit 10, the current-to-voltage converter amplifier 11, the logarithmic converter circuit 12, the comparator circuit 13, and the integrator circuit 14.

When the sample 39 should be observed, the z piezoelectric device of the tubular scanner 35 is driven in the same way as in the case of the conventional scanning tunneling microscope already described in connection with FIG. 3. The probe 41 is brought close to the sample 39 until the distance between them reaches the initial set distance d (nm). Under this condition, the x and y piezoelectric devices of the tubular scanner 35 are driven according to x and y scanning signals, respectively, so that the probe 41 scans the surface of the sample 39 in the x- and y-directions.

Concurrently, a bias voltage is applied between the sample 39 and the probe 41. A tunneling current flows from the probe 41 to the sample 39. This tunneling current varies as the probe 41 scans the surface of the sample 39 in the x- and y-directions. Accordingly, the distance between the sample 39 and the probe 41 is controlled such that the tunneling current is retained constant if the probe 41 scans in the x- and y-directions. The amount of control in response to the variation in the tunneling current, i.e., the elongation or contraction of the tubular scanner 35 in the z-direction, is displayed on the CPU monitor. Consequently, a topographic image of the surface of the sample 39 is obtained at an atomic-scale resolution.

In this way, this scanning probe microscope 30 uses the common tubular scanner 35, whether this instrument operates as an atomic force microscope or as a scanning tunneling microscope. Hence, this microscope needs only one tubular scanner 35. Therefore, a cost reduction corresponding one scanner can be accomplished. Furthermore, the magnification is required to be adjusted only for this tubular scanner 35 alone. Therefore, the time required for adjustments can be shortened. Moreover, the labor required to make adjustments can be decreased.

What is claimed is:

1. A method of analyzing samples, using a scanning probe microscope having a scanner, a first removable head unit for supporting an atomic force tip held independent of said scanner, a second removable head unit for supporting said scanner, a scanning tunneling microscope tip mount attachable to the front end of said scanner, a base stage, and a sample stage, said method comprising the steps of:

performing atomic force microscopy, mounting said scanner to said base stage, mounting said first removable head unit over said base stage, and measuring an atomic force exerted between said atomic force tip and a sample spaced a distance from said atomic force tip while adjusting this distance; and performing scanning tunneling microscopy, dismounting said scanner from said base stage, mounting said sample stage on said base stage, mounting said second removable head unit over said base stage, mounting said scanner opposite to said sample stage on said second removable head, and affixing said scanning tunneling microscope tip to said scanner, applying a voltage between a sample held to said sample stage and said scanning tunneling tip, and measuring a tunneling current flowing between said scanning tunneling tip and said sample.

2. A scanning probe microscope capable of operating either in an atomic force microscopy mode or in a scanning tunneling microscopy mode, said scanning probe microscope comprising:

a scanner and a base stage both used in both of said atomic force mode and said scanning tunneling mode;

an atomic force tip and a scanning tunneling tip;

a sample stage used only in the scanning tunneling mode, a sample holder used only in said atomic force mode;

a first removable head unit for supporting the atomic force tip in the atomic force mode;

a second removable head unit for supporting the scanner;

and wherein, when said sample is analyzed by atomic force microscopy, said scanner is mounted to said base stage, said sample holder is mounted to said scanner, said atomic force tip is brought close to said sample attached to said sample holder, such that atomic force exerted between said sample and said atomic force tip may be measured;

and wherein, when said sample is analyzed by scanning tunneling microscopy, said sample stage is mounted to said base stage, mounting said scanning tunneling tip to said scanner, holding said scanner opposite to said sample stage such that said scanning tunneling tip is close to said sample held to said sample stage, such that a tunneling current flowing between said sample and said scanning tunneling tip may be measured.

3. The scanning probe microscope of claim 2, comprising means for measuring said atomic force comprising a cantilever having a front end to which said atomic force tip is mounted and a means for detecting deflections of said cantilever.

4. The scanning tunneling microscope of claim 2 or 3, wherein said means for measuring said atomic force are mounted to an atomic force head, and wherein said scanner is mounted to a scanning tunneling head.

5. A scanning probe microscope comprising:

a scanner;

a scanner holder for holding said scanner, said scanner holder having first contact electrodes permitting said scanner to be electrically energized;

a base unit;

first contact pins detachably mounted to said base unit and capable of being electrically connected with said first contact electrodes;

an XYZ stage to which said scanner holder can be mounted;

a laser detachably mounted to said base unit;

a cantilever having a front end to which a probe is attached;

an atomic force head to which said laser, said cantilever, and a photodetector are mounted;

a sample stage detachably mounted to said XYZ stage and having second contact electrodes capable of making contact with said first contact pins;

a sample holder detachably mounted to said scanner and to said sample stage and holding a sample; and a scanning tunneling head detachably mounted to said base unit and having second contact pins and a scanner holder receiver to which said scanner holder can be mounted, said second contact pins being capable of being electrically connected with said first contact electrodes.

* * * * *